April 28, 1964 J. C. HOOVER 3,131,365

TR SWITCH HAVING UNBIASED DIODES WHICH SHORT DURING TRANSMISSION AND RESONATE INDUCTANCE DURING RECEPTION

Filed May 16, 1962

INVENTOR.
JOHN C. HOOVER
BY
John H. Gallagher
ATTORNEY 3,131,365

TR SWITCH HAVING UNBIASED DIODES WHICH SHORT DURING TRANSMISSION AND RESONATE INDUCTANCE DURING RECEPTION

John C. Hoover, Clearwater, Fla., assignor to Sperry Rand Corporation, Great Neck, N.Y., a corporation of Delaware Filed May 16, 1962, Ser. No. 195,240
3 Claims. (Cl. 333—7)

This invention relates to duplexers for electromagnetic waves, and more particularly to high power duplexers using semiconductor diodes as voltage dependent circuit elements for controlling impedance levels within a circuit to achieve the duplexing operation.

The duplexing operation in many present radar and communication systems is accomplished by means of the well-known arrangements of TR and ATR tubes. Although these devices have been used quite extensively, they have the undesirable features of passing to the receiver a voltage spike at the leading edge of each transmitted pulse, and have limited lifetimes. The cost of parts and labor involved in the continual replacement of the TR and ATR tubes in a radar system can amount to a large amount in a relatively short period of time.

The development within recent years of semiconductor diodes that function as voltage-controllable nonlinear capacitors (varactor diodes), and nonlinear resistors (p-i-n diodes) has resulted in a limited use of these devices to control microwave power. These devices offer the advantages of eliminating the above-mentioned leading-edge spike, and have extended lifetimes, both of which can contribute significantly to the reliability of a radar system.

A varactor diode of the type utilized in this invention exhibits the characteristic that its capacitive reactance is a nonlinear function of the voltage applied across its terminals, and as used in waveguide structures, is a nonlinear function of the incident radio frequency (R.F.) power propagating within the structure. At low powers within the milliwatt region in the L-band and C-band portions of the radio frequency spectrum, the varactor diode acts as a linear capacity and exhibits a Q of reasonably high value, i.e. 40, wherein $$Q=\frac{X_c}{R_s}$$

$X_c$ being the capacitive reactance of the diode and $R_s$ its series resistance. At power levels in the watt and multiwatt region, the capacitive reactance of the varactor becomes negligible as compared to the bulk resistance of the semiconductor and the series lead inductance of the diode package. The change in impedance of the diode between low and high power levels may approach the magnitude of $Q^2$, i.e. 1600. It is this impedance change with power level that is utilized in the present invention to obtain duplexing action.

In co-pending application S.N. 195,097, filed May 16, 1962 in the name of J. C. Hoover an improved duplexing apparatus employing semiconductor diodes, such as varactor diodes, is disclosed. The apparatus disclosed in that application is quite useful at low and medium power levels, but the design and operating characteristics of that device are not as well suited for use in radar and communication systems operating in the megawatt power level region. The duplexer of the present invention provides a novel and unusual means for mounting a great many varactor diodes in a TEM mode transmission line device so that a significantly greater number of diodes may share the high power transmitted energy, thus permitting the device to operate at appreciably higher power levels. Additionally, the device of this invention provides novel and unusual means for tuning the reactance of the diodes to control impedance levels within the system in such a way as to accomplish the desired duplexing, or switching action.

It is an object of the present invention to provide a high power semiconductor switching apparatus.

It is a further object of the present invention to provide a high power duplexing apparatus in a relatively small and simple physical embodiment that includes a great many semiconductor variable impedance elements.

These and other objects and advantages of the present invention will become more apparent from the following specification and claims which will be described by referring to the accompanying drawings within.

Figures 1, 2:
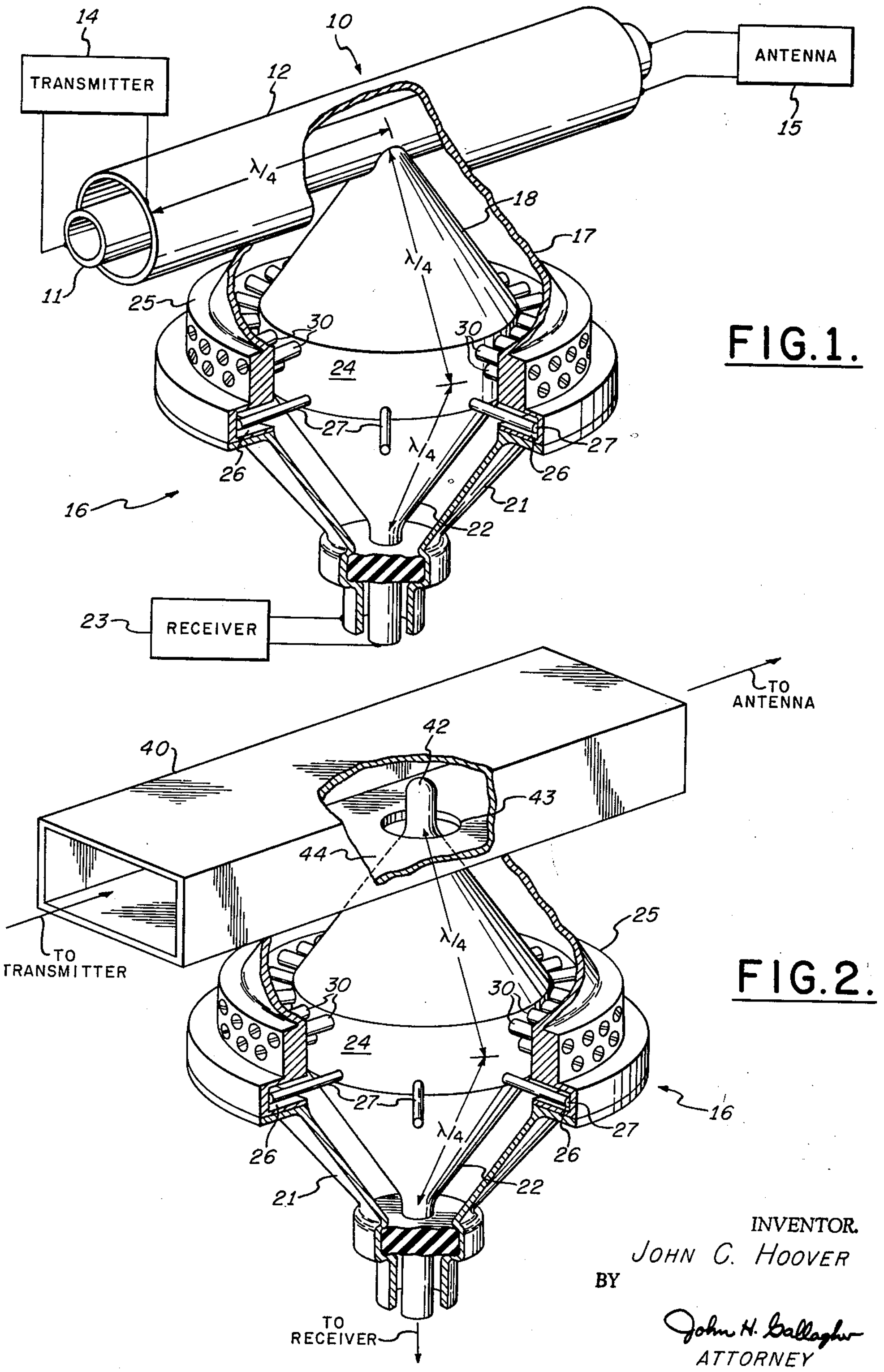
FIG. 1 is a plan view, partially broken away, illustrating an embodiment of the present invention adapted to operate with coaxial transmission lines.
FIG. 2 is a plan view, partially broken away, illustrating the use of the present invention with rectangular uniconductor waveguides.

Referring now in detail to FIG. 1, the duplexing apparatus constructed in accordance with the present invention is comprised of a coaxial transmission line 10 having an inner conductor 11 and outer conductor 12. A transmitter 14 may be connected to the left end of coaxial line 10, and an antenna 15 may be connected to the right end thereof. The switching apparatus 16 that provides the voltage-controllable duplexing action for the device of this invention is coupled as a branch transmission line between the receiver 23 and a region on the coaxial transmission line 10 and is located substantially an odd multiple, preferably one, of a quarter-wavelength from the transmitter 14. Switching apparatus 16 is comprised of a first transition section formed by a conical counter conductor 17 and a conical inner conductor 18 each respectively in conductive contact with outer and inner conductors 12 and 11 of coaxial transmission line 10. The lower portion of the switching apparatus 16 is comprised of a second transition section formed by conical outer conductor 21 and conical inner conductor 22. An inner cylindrical section 24 conductively joins inner transition sections 18 and 22, and an outer housing member 25 and a radially extending stub section 26 form part of the outer conductor that connects outer transition sections 17 and 21. As may be seen, a TEM mode propagation path is provided through switching section 16 between coaxial transmission line 10 and receiver 23.

A plurality of conductive rods 27 are symmetrically disposed with respect to the central axis of switching section 16 and extend radially between, and are in conductive contact with, inner cylindrical section 24 and the inner surface of radially extending stub section 26. Radially extending stub section 26 and conductive rods 27 function as a circumferentially extending inductive tuning stub in shunt with the branch transmission line of switching section 16.

A plurality of voltage-controllable impedance elements 30, such as varactor diodes, extend between, and are in contact with, inner cylindrical section 24 and conductive housing member 25. Said diodes are inserted into place through two closely spaced rows of receptacles that extend around the circumference of housing member 25. In practice, as many as 100 diodes may be employed in the device illustrated in FIG. 1.

In order to assure that no spurious transmission line modes are set up in the branch transmission line of switching section 16, the diodes 30 and conductive rods 27 should be symmetrically disposed around the central axis of the branch transmission line.

The power handling capability of the device illustrated in FIG. 1 is a function of an insertion loss during the transmitting portion of the operating cycle, and because this insertion loss is distributed over the great number of diodes 30, it is apparent that the device of FIG. 1 will operate satisfactorily at high power levels.

Varactor diodes 30 may be of the type MA-4342A, manufactured by Microwave Associates Inc., Burlington, Massachusetts. These diodes are relatively low priced, are rugged, and are representative of the more commonly used varactor diodes. The use of these types of diodes in microwave switching apparatus has been proposed in the past. As used in known prior art devices, it was desired that the diodes present substantially a short-circuit across a transmission line when high power electromagnetic waves were incident thereon. However, it has been found that when the diodes conduct, the impedance is not as low as desirable inasmuch as the inductance of the leads of the diode package becomes appreciable, particularly at the higher frequencies. Additionally, the capacitive reactance presented by the diode when low power electromagnetic waves were incident thereon was relied upon for establishing impedance levels within the switching circuit. This impedance by itself, is not always high enough to assure satisfactory operation of the device. To achieve acceptable results using the prior art devices, higher-priced diodes specially constructed to minimize lead inductance are required. The present invention, however, makes use of the otherwise objectionable feature of the lower-priced varactor diodes to actually improve the performance of a high power duplexer, thus offsetting the cost of the great many diodes required in the device of the present invention.

Considering now the operation of the device of FIG. 1 when low power electromagnetic waves are coupled from antenna 15 and are incident on varactor diodes 30, each of said diodes presents a capacitive reactance between the conductors of the branch transmission line forming switching section 16. The inductive reactance presented by the circumferentially extending inductive tuning stub formed by radially extending stub 26 and rods 27 is proportioned to parallel resonate with the combined capacitive reactance of the diodes, and because the resulting impedance of the resonate circuit is quite high, it will appear substantially as an open-circuit between the conductors and will not affect the flow of power from the antenna 15 to receiver 21. The junction of switching section 16 with coaxial line 10 is spaced from the transmitter the required distance so that the impedance of the non-conducting transmitter will be transformed to said junction to provide the proper impedance to effectively block the received waves from propagating to the transmitter, thus directing them substantially exclusively into switching section 16. If desired, another switching section may be coupled to coaxial line 10 to provide this ATR function.

During the transmitting portion of the operating cycle when high power electromagnetic waves are propagating on coaxial transmission line 10 from transmitter 14, the high power electromagnetic waves incident on diodes 30 cause said diodes to conduct. In this condition, the impedance of each diode is comprised only of the series resistance of the diode and the inductive reactance of the diode leads. The parallel combination of the impedances of the large number of varactor diodes 30 and the inductance of the circumferentially extending inductive tuning stub will effectively short out the receiver line a quarter wavelength from coaxial transmission line 10. This is reflected as a high input impedance at the junction end of the branch transmission line and will result in a negligible disturbance to the transfer of power from transmitter 14 to antenna 15.

As just described, no voltage bias is applied to varactor diodes 30. It may be desirable under some conditions to apply a bias voltage to the diodes. This may be accomplished in a conventional manner and is within the contemplation of the present invention.

Another embodiment of the high power semiconductor switching device of the present invention is illustrated in FIG. 2 wherein the main transmission line between the transmitter and antenna is a rectangular uniconductor waveguide 40. Switching section 16 is substantially identical to the similarly-numbered switching section 16 of FIG. 1 with the exception that the conical inner conductor 18 of the first transition section is coupled to rectangular waveguide 40 by means of a conductive probe 42 that extends through aperture 43 in the bottom broad wall 44 of waveguide 40. The device of FIG. 2 otherwise is similar in all respects to the device described in FIG. 1.

Although varactor diodes have been used as an example of voltage-controllable variable impedance elements in the above discussion, it is to be understood that other types of variable impedance elements having properties compatible with the principles of operation of this invention may be employed as well.

While the invention has been described in its preferred embodiments it is to be understood that the words which have been used are words of description and that changes within the purview of the appended claims may be made without departing from the true scope and spirit of the invention in its broader aspects.

What is claimed is:

1. High power semiconductor switching apparatus comprising,
   a first electromagnetic wave transmission line,
   a branch coaxial transmission line having at least two conductors and coupled to said first transmission line at a region intermediate the two ends thereof,
   said branch transmission line having inner and outer conductors of greatly enlarged diameters at a distance substantially a quarter wavelength from the junction of said two transmission lines,
   a shunt-connected inductive tuning stub extending circumferentially around the enlarged portion of said branch transmission line,
   a plurality of voltage-controllable variable impedance elements symmetrically disposed between the conductors of said branch transmission line at the enlarged portion thereof,
   said impedance elements being characterized by presenting a relatively large capacitive reactance when low power electromagnetic waves are incident thereon and a relatively low inductive reactance when high power electromagnetic waves are incident thereon,
   the inductive reactance of said shunt-connected tuning stub being proportioned to parallel resonate with the capacitive reactance presented by said impedance elements when low power electromagnetic waves are incident thereon,
   thereby providing a high impedance between the conductors of said branch transmission line to permit low power electromagnetic waves to propagate substantially unaffected through said branch transmission line.

2. High power semiconductor switching apparatus comprising
   a first TEM mode transmission line having at least two conductors,
   a branch coaxial transmission line having two conductors respectively coupled to the two conductors of said first transmission line at a region intermediate to the two ends thereof,
   said branch transmission line having inner and outer conductors of greatly enlarged diameters at a distance substantially a quarter wavelength from the junction of said two transmission lines,
   a shunt-connected inductive tuning stub extending circumferentially around the enlarged portion of said branch transmission line,
   a plurality of voltage-controllable variable impedance elements symmetrically disposed between the conductors of said branch transmission line at the enlarged portion thereof, said impedance elements being characterized by presenting a relatively large capacitive reactance when low power electromagnetic waves are incident thereon and a relatively low inductive reactance when high power electromagnetic waves are incident thereon.

the inductive reactance of said shunt-connected tuning stub being proportioned to parallel resonate with the capacitive reactance presented by said impedance elements when low power electromagnetic waves are incident thereon, thereby providing a high impedance between the conductors of said branch transmission line to permit low electromagnetic waves to propagate substantially uaffected through said branch transmission line.

3. High power semiconductor switching apparatus comprising a first TEM mode transmission line having at least two conductors, a branch TEM mode transmission line connected to said first transmission line intermediate the two ends thereof, a transmission line connector coupled to the opposite end of said branch transmission line, said branch transmission line being comprised of coaxial inner and outer conductors shaped to form conical transition sections at opposite ends thereof, said transition sections having their base portions extending inwardly to face each other in spaced-apart relationship, a cylindrically shaped inner conductor member conductively joining the base portions of the inner conductors of said two transition sections, a cylindrically shaped outer conductor housing member connected to the outer conductor of one of said transition sections, a radially extending stub section extending circumferentially around said branch transmission line and conductively connected between said outer housing member and the outer conductor of the other one of said transition sections, a plurality of radially extending conductors symmetrically disposed with respect to the central axis of said branch transmission line and extending between the inner cylindrical member and the inner surface of said stub section, thereby forming with said stub section a shunt-connected tuning stub extending around said branch transmission line, a plurality of voltage-controllable variable impedance elements circumferentially disposed in a symmetrical manner around said branch transmission line between said outer housing member and said inner cylindrical member, said impedance elements being spaced substantially a quarter wavelength from both ends of said branch transmission line, each of said impedance elements being characterized by presenting a relatively large capacitive reactance when low power electromagnetic waves are incident thereon and a low predominantely inductive reactance when high power electromagnetic waves are incident thereon, the radial extent of said stub section and said conductive rods being proportioned so that said circumferentially extending stub section presents an inductive reactance to parallel resonate with the capacitive reactance presented by said impedance elements when low power electromagnetic waves are incident thereon, thereby providing a high impedance between the conductors of said branch transmission line to permit low power electromagnetic waves to propagate substantially unaffected from said first transmission line to said transmission line connector at the opposite end of said branch transmission line.

No references cited.